United States Patent
Jung

(10) Patent No.: US 10,526,012 B2
(45) Date of Patent: Jan. 7, 2020

(54) METHOD FOR SIDE SLIP ANGLE VARIABLE CONTROL OF VEHICLE HAVING REAR WHEEL STEERING SYSTEM

(71) Applicants: Hyundai Motor Company, Seoul (KR); Kia Motors Corporation, Seoul (KR)

(72) Inventor: Jang Hyun Jung, Whasung-si (KR)

(73) Assignees: Hyundai Motor Company, Seoul (KR); KIA Motors Corporation, Seoul (KR)

( * ) Notice: Subject to any disclaimer, the term of this patent is extended or adjusted under 35 U.S.C. 154(b) by 132 days.

(21) Appl. No.: 15/684,330

(22) Filed: Aug. 23, 2017

(65) Prior Publication Data

US 2018/0170425 A1 Jun. 21, 2018

(30) Foreign Application Priority Data

Dec. 15, 2016 (KR) .......................... 10-2016-0171370

(51) Int. Cl.
| | | |
|---|---|---|
| *B62D 7/15* | (2006.01) | |
| *B62D 15/02* | (2006.01) | |
| *G05D 1/02* | (2006.01) | |

(52) U.S. Cl.
CPC ............ *B62D 7/159* (2013.01); *B62D 15/021* (2013.01); *G05D 1/021* (2013.01)

(58) Field of Classification Search
CPC ....... B62D 7/159; B62D 15/021; G05D 1/021
See application file for complete search history.

(56) References Cited

U.S. PATENT DOCUMENTS

| | | | |
|---|---|---|---|
| 4,778,023 A | | 10/1988 | Sugasawa |
| 4,958,698 A | * | 9/1990 | Kirschner .............. B62D 7/159 180/408 |
| 5,607,028 A | * | 3/1997 | Braun .................. B62D 7/1509 180/24.01 |

(Continued)

FOREIGN PATENT DOCUMENTS

| | | |
|---|---|---|
| JP | H 07251754 A | 10/1995 |
| JP | H 09254803 A | 9/1997 |

(Continued)

*Primary Examiner* — Nicholas Kiswanto
(74) *Attorney, Agent, or Firm* — Morgan, Lewis & Bockius LLP

(57) ABSTRACT

A method for side slip angle variable control of a vehicle having a rear wheel steering system, may include a first step of determining a first steering angle ratio value which corresponds to a steering angle ratio of a front wheel and a rear wheel in a driver driving mode and determining a second steering angle ratio value which corresponds to the steering angle ratio of the front wheel and the rear wheel in an autonomous driving mode; a second step of determining a rear-wheel steering angle through determination by the second steering angle ratio value and comparing the rear-wheel steering angle with a predetermined maximum steering angle of a rear wheel steering (RWS); and a third step of determining any one driving mode of the driver driving mode and the autonomous driving mode when the rear-wheel steering angle is determined to be smaller than the RWS maximum steering angle.

6 Claims, 2 Drawing Sheets

(56) References Cited

U.S. PATENT DOCUMENTS

| | | | | | |
|---|---|---|---|---|---|
| 5,904,218 | A | * | 5/1999 | Watkins | B62D 61/02 |
| | | | | | 180/209 |
| 6,164,406 | A | * | 12/2000 | Diekhans | B62D 7/1509 |
| | | | | | 180/327 |
| 6,615,944 | B1 | * | 9/2003 | Horwath | B62D 7/159 |
| | | | | | 180/204 |
| 8,983,728 | B2 | * | 3/2015 | Kossira | B62D 7/159 |
| | | | | | 701/41 |
| 2018/0244257 | A1 | * | 8/2018 | Kneitz | B60K 6/448 |

FOREIGN PATENT DOCUMENTS

| | | | |
|---|---|---|---|
| JP | 5516498 | B2 | 6/2014 |
| KR | 10-1997-0065303 | A | 10/1997 |
| KR | 10-1998-0071817 | A | 10/1998 |
| KR | 10-2012-0008621 | A | 2/2012 |

* cited by examiner

METHOD FOR SIDE SLIP ANGLE VARIABLE CONTROL OF VEHICLE HAVING REAR WHEEL STEERING SYSTEM

CROSS-REFERENCE TO RELATED APPLICATION

The present application claims priority to Korean Patent Application No. 10-2016-0171370 filed on Dec. 15, 2016, the entire contents of which are incorporated herein for all purposes by this reference.

BACKGROUND OF THE INVENTION

Field of the Invention

The present invention relates to a method for side slip angle variable control of a vehicle having a rear wheel steering system. More particularly, it relates to a method for side slip angle variable control of a vehicle having a rear wheel steering system which varies a side slip angle by differently controlling a rear wheel steering angle of the vehicle having the rear wheel steering system depending on autonomous driving and manual driving.

Description of Related Art

In general, a rear wheel steering (RWS) system has been developed to enhance pivot performance of a vehicle or responsiveness of a course change by steering a rear wheel at a predetermined angle in a reverse direction or a positive direction when a front wheel is steered at a predetermined angle to improve the pivot performance and trackability thereof.

The rear wheel steering system includes a lead screw controlling steering of the rear wheel by a linear motion, a motor controlling a momentum and a direction of the lead screw, an electronic control unit (ECU) controlling a rotational direction and a rotational angle of the motor, and a sensor.

That is, the rear wheel steering system as a system that finally automatically controls the steering angle of the rear wheel by controlling the rotational direction and angle of the motor depending on the control of the ECU contributes to enhancing quickness and increasing stability during high-speed driving.

However, a device that controls a posture of the vehicle by controlling the rear wheel steering system uses a scheme that controls a rear-wheel tire angle at a ratio resulting from estimating a front-wheel tire angle.

In other words, the rear-wheel tire angle is determined through a gear ratio map tunable with respect to the front-wheel tire angle, and a rear-wheel control angle determines the same phase as or a reverse phase to the front wheel according to a vehicle velocity.

In more detail, since a posture control device using the rear wheel steering system uses a scheme that controls the rear wheel by use of a simple gear ratio of the front wheel and the rear wheel, that is, an open loop based control scheme not considering the posture of the vehicle, it is difficult to stably control the posture of the vehicle and inaccurate control is performed to cause movement of the vehicle to be sluggish or in an unstable state.

The information disclosed in this Background of the Invention section is only for enhancement of understanding of the general background of the invention and should not be taken as an acknowledgement or any form of suggestion that this information forms the related art already known to a person skilled in the art.

BRIEF SUMMARY

Various aspects of the present invention are directed to providing a method for side slip angle variable control of a vehicle having a rear wheel steering system, which determines a driving mode with respect to the vehicle having the rear wheel steering system and thereafter, controls front and rear-wheel steering angle ratios to be different from each other according to the resulting autonomous driving mode and driver driving mode to minimize the side slip angle in the autonomous driving mode and reduce a sense of driving difference in the driver driving mode.

Various aspects of the present invention are directed to providing a method for side slip angle variable control of a vehicle having a rear wheel steering system, including: a first step of determining a first steering angle ratio value which corresponds to a steering angle ratio of a front wheel and a rear wheel in a driver driving mode and determining a second steering angle ratio value which corresponds to the steering angle ratio of the front wheel and the rear wheel in an autonomous driving mode; a second step of determining a rear-wheel steering angle through determination by the second steering angle ratio value and comparing the rear-wheel steering angle with a predetermined maximum steering angle of a rear wheel steering (RWS); and a third step of determining any one driving mode of the driver driving mode and the autonomous driving mode when the rear-wheel steering angle is determined to be smaller than the RWS maximum steering angle.

In an exemplary embodiment, in the third step, when the driver driving mode is determined, the first steering angle ratio value previously determined in the first step may be applied.

In another exemplary embodiment, in the third step, when the autonomous driving mode is determined, the second steering angle ratio value previously determined in the first step may be applied.

In still another exemplary embodiment, in the second step, when the rear-wheel steering angle is determined to be larger than the RWS maximum steering angle, any one driving mode of the driver driving mode and the autonomous driving mode may be determined.

In yet another exemplary embodiment, in the second step, when the driver driving mode is determined, the first steering angle ratio value previously determined in the first step may be applied and when the autonomous driving mode is determined, the RWS maximum steering angle may be applied to the rear-wheel steering angle.

According to an exemplary embodiment of the present invention, a driving mode is determined with respect to the vehicle having the rear wheel steering system and thereafter, front and rear-wheel steering angle ratios are controlled to be different from each other according to the resulting autonomous driving mode and driver driving mode to minimize the side slip angle in the autonomous driving mode and reduce a sense of driving difference in the driver driving mode.

Other aspects and exemplary embodiments of the invention are discussed infra.

It is understood that the term "vehicle" or "vehicular" or other similar term as used herein is inclusive of motor vehicles in general including passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
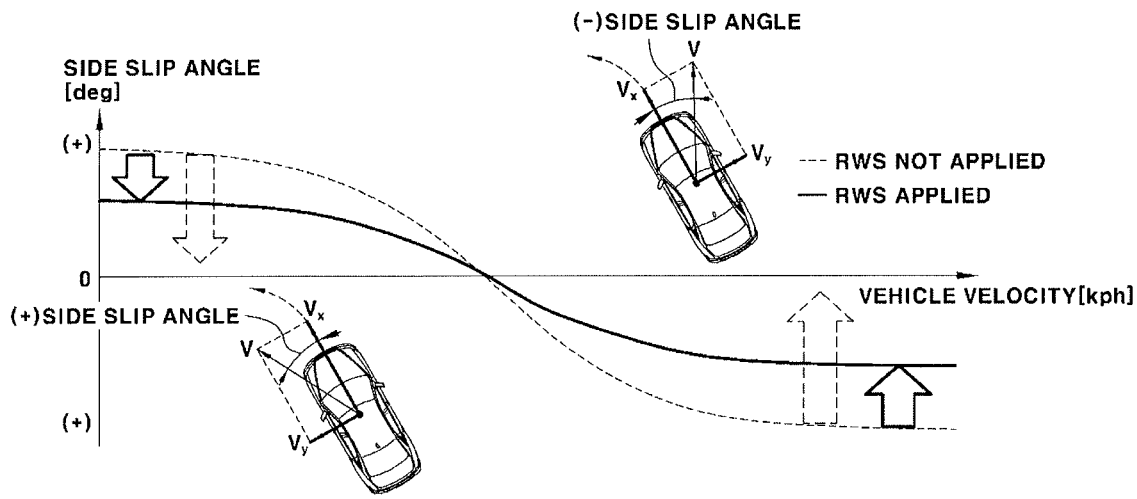
FIG. 1 is a diagram illustrating a rear wheel steering (RWS) application state to a method for a side slip angle variable control of a vehicle having a rear wheel steering system according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is intended to cover not only the exemplary embodiments, but also various alternatives, modifications, equivalents and other embodiments, which may be included within the spirit and scope of the invention as defined by the appended claims.

Hereinafter, an exemplary embodiment of the present invention will be described in detail with reference to the accompanying drawings.

The advantages and features of the present invention and a method of acquiring them will become obvious with reference to embodiments to be described below in detail along with the accompanying drawings.

However, the present invention is not limited to the embodiments set forth below, and may be embodied in various other forms. The present exemplary embodiments are provided to make the present invention clear and to help a person with ordinary skill in the art completely understand the scope of the invention the present invention pertains to, and the present invention will only be defined by the scope of the claims.

In describing the present invention, when it is determined that known associated technologies, and the like may obscure the subject matter of the present invention, a detailed explanation thereof may be omitted.

Figure 2:
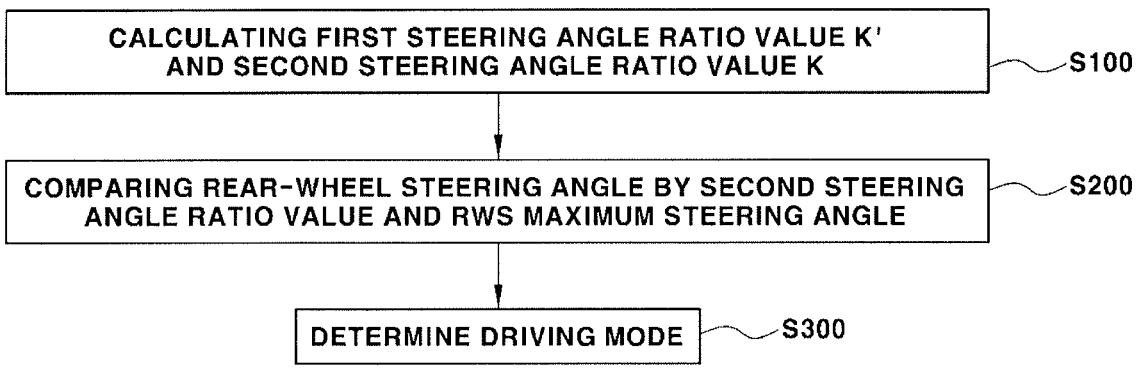
FIG. 2 is a diagram sequentially illustrating a method for a side slip angle variable control of a vehicle having a rear wheel steering system according to an exemplary embodiment of the present invention.
Figure 3:
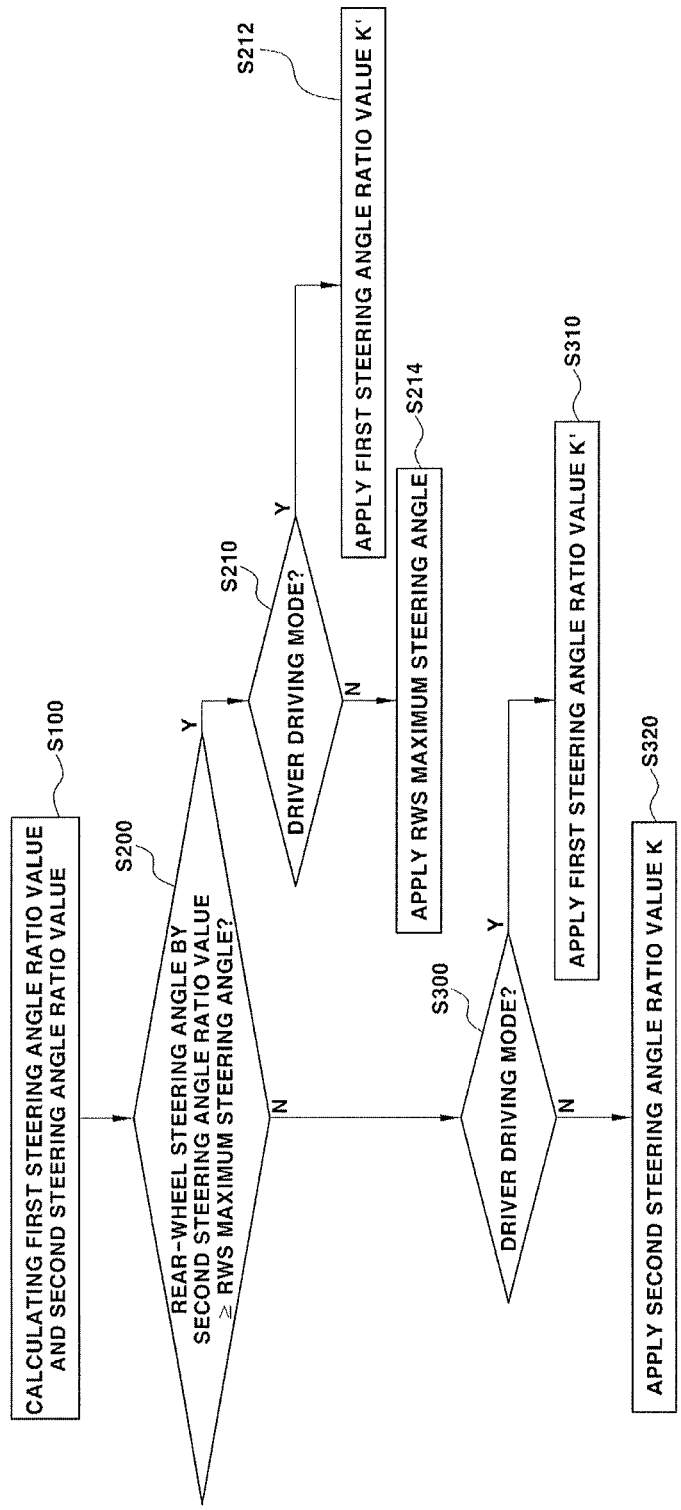
FIG. 3 is a block diagram illustrating a method for a side slip angle variable control of a vehicle having a rear wheel steering system according to an exemplary embodiment of the present invention.

FIG. 1 is a diagram illustrating a rear wheel steering (RWS) application state to a method for a side slip angle variable control of a vehicle having a rear wheel steering system by an electronic control unit (ECU) according to an exemplary embodiment of the present invention; FIG. 2 is a diagram sequentially illustrating a method for a side slip angle variable control of a vehicle having a rear wheel steering system according to an exemplary embodiment of the present invention; and FIG. 3 is a block diagram illustrating a method for a side slip angle variable control of a vehicle having a rear wheel steering system according to an exemplary embodiment of the present invention.

In general, a rear wheel steering (RWS) system is applied, which can enhance pivot performance of a vehicle or responsiveness of a course change by steering a rear wheel at a predetermined angle in a reverse direction or a positive direction when a front wheel is steered at a predetermined angle to improve the pivot performance and trackability thereof.

That is, optimal tuning may be achieved under a condition without a sense of driving difference by setting a ratio of a rear-wheel steering angle to a front-wheel steering angle according to a vehicle velocity by applying the rear wheel steering system.

For example, reducing a side slip angle meaning an angle between a heading direction Vx of a vehicle body and a vehicle velocity progress direction V is required to optimally implement quickness and safety when the vehicle pivots as illustrated in FIG. 1.

In other words, as a difference between the vehicle body heading direction Vx and the velocity progress direction V decreases, the quickness may be enhanced at a low velocity and stability may be enhanced at a high velocity.

As a reduction amount of the side slip angle increases, a sense of steering difference may be generated while driving in the driver driving mode and the reason is that a driver recognizes and steers a difference between a direction in which the driver intends to go and a current progress direction and when the difference between the two directions is intentionally reduced, the driver feels a sense of difference against the existing driving habit.

Therefore, the side slip angle may not be reduced to be minimal to prevent the driver from generating the sense of difference in the driver driving mode.

On the contrary, in the case of an autonomous driving mode, since an influence on a driving steering sense of the driver is small as compared with the driver driving mode, controlling the side slip angle to be reduced is required to implement optimal performance.

Therefore, a control method for minimizing the side slip angle in the autonomous driving mode, that is, the method for the side slip angle variable control of the vehicle having the rear wheel steering system according to the embodiment is sequentially described below as illustrated in FIG. 2 and FIG. 3.

First, in the driver driving mode, a first steering angle ratio value K' is determined, which corresponds to the steering angle ratio of the front wheel and the rear wheel and in the autonomous driving mode, a second steering angle ratio value K is determined, which corresponds to the steering angel ratio of the front wheel and the rear wheel (S100).

$$K = \frac{\frac{mL_f}{LC_r} \cdot V^2 - L_r}{\frac{mL_r}{LC_f} \cdot V^2 - L_f} \approx \alpha K' \quad (\alpha \geq 1) \quad \text{[Equation]}$$

$L_f$: the length from a center of gravity of a vehicle to a front wheel axle of the vehicle
$L_r$: the length from the center of gravity of a vehicle to a rear wheel axle of the vehicle
L: ($L_f$+$L_r$) the length between the front wheel axle and the rear wheel axle
m: weight of the vehicle
V: vehicle speed
$C_f$: cornering strength of the front wheel tire
$C_r$: cornering strength of the rear wheel tire That is, the second steering angle ratio value K corresponding to the steering angle ratio of the front wheel and the rear wheel in the autonomous driving mode is implemented based on a general vehicle motion equation and a predetermined steering angle relationship set between the front wheel and the rear wheel, in other words, the steering angle ratio value K' of the front wheel and the rear wheel in the predetermined driver driving mode in a development step of the vehicle according to an evaluation/quality joint evaluation criterion to reduce the sense of difference of the driver.

In the [Equation], a vehicle reaction α is shown according to a change aspect of the vehicle velocity V and the vehicle reaction α is primarily dynamically changed in link with initial conditions including a weight m, a weight distribution, and a front-rear length L of the vehicle and a change in vehicular characteristic $C_f$ and $C_r$ depending on a steering input for each velocity including tire friction force and the vehicle reaction α is set as a control factor corresponding to the vehicular characteristic to minimize an error.

Herein, the first steering angle ratio value K' and the second steering angle ratio value K are previously determined and stored by the [Equation] and in the instant case, the first steering angle ratio value K' which is the ratio of the front-wheel steering angle and the rear-wheel steering angle in the driver driving mode is preferably formed as 0.1.

The second steering angle ratio value K is preferably formed as 0.4, which corresponds to the ratio of the front-wheel steering angle and the rear-wheel steering angle in the autonomous driving mode.

Meanwhile, the rear-wheel steering angle is determined through determination by the second steering angle ratio value K and the rear-wheel steering angle in the instant case is compared with a predetermined maximum steering angle of the rear wheel steering (hereinafter, referred to as RWS) (S200).

In the instant case, when it is determined that the determined rear-wheel steering angle is equal to or larger than the maximum steering angle of the RWS, any one driving mode of the driver driving mode and the autonomous driving mode is determined (S210).

Herein, when it is determined that the driving mode of the vehicle is the driver driving mode, the first steering angle ratio value K' previously determined in step S100 is applied (S212)

In determining the driving mode of the vehicle, when it is determined whether a steering wheel is gripped by a sensor preinstalled in a steering wheel of the vehicle and thereafter, it is determined that the steering wheel is not gripped while steering, it may be determined that the driving mode is the autonomous driving mode and further, when it is determined that torque of the vehicle detected while steering is constant, it may be determined that the driving mode is the autonomous driving mode.

When any one driving mode of the driver driving mode and the autonomous driving mode is determined (S210) and it is determined that the driving mode of the vehicle is the autonomous driving mode, the maximum steering angle of the RWS is determined as the rear-wheel steering angle to the front-wheel steering angle (S214).

The RWS rear-wheel steering angle is set depending on a change in length of a horizontal stroke of the RWS system and since the stroke has a predetermined length, there is a limit in change of the length and herein, the maximum steering angle corresponding to the limit is determined and stored as the maximum steering angle of the RWS.

In other words, as a result of determining the rear-wheel steering angle based on the second steering angle ratio value K in the autonomous driving mode, it is determined that the rear-wheel steering angle is equal to or larger than the maximum steering angle of the RWS and when it is determined that the driving mode of the vehicle is the autonomous driving mode (S210), the rear-wheel steering angle corresponding to the second steering angle ratio value K is not applied but a rear-wheel steering angle previously set to a previously set RWS maximum steering angle, preferably, 2 deg is applied.

For example, when the rear-wheel steering angle in the driver driving mode is 2 deg, the front-wheel steering angle is 20 deg according to the first steering angle ratio value K' and when the second steering angle ratio value K is applied to the front-wheel steering angle, the rear-wheel steering angle is determined as 8 deg in the autonomous driving mode and in the instant case, since the rear-wheel steering angle in the autonomous driving mode is larger than the previously set RWS maximum steering angle, that is, 2 deg, not 8 deg but 2 deg which is the previously set RWS maximum steering angle is applied to the rear wheel steering angle in the autonomous driving mode.

Meanwhile, as a result of comparing the rear-wheel steering angle and the previously set RWS maximum steering angle (S200), when it is determined that the rear-wheel steering angle is smaller than the RWS maximum steering angle, any one driving mode of the driver driving mode and the autonomous driving mode is determined (S300).

Herein, when it is determined that the driving mode of the vehicle is the driver driving mode, the first steering angle ratio value K' previously determined in step S100 is applied (S310).

When it is determined that the driving mode of the vehicle is the autonomous driving mode, the second steering angle ratio value K previously determined in step S100 is applied (S320).

Herein, in determining the driving mode of the vehicle, when it is determined whether the steering wheel is gripped by the sensor preinstalled in the steering wheel of the vehicle and thereafter, it is determined that the steering wheel is not gripped while steering similarly to step (S210) of determining any one driving mode of the driver driving mode and the autonomous driving mode, it may be determined that the driving mode is the autonomous driving mode and further, when it is determined that the torque of the vehicle detected while steering is constant, it may be determined that the driving mode is the autonomous driving mode.

When the conditions may not be met, it may be determined that the driving mode is the driver driving mode.

The driving mode of the vehicle may be determined not by any one method but the sensor disposed in the steering wheel and the detected torque value or other general methods which are already known, and as a result, in the exemplary embodiment, detailed applications and descriptions of the determination of the driving mode will be omitted.

Therefore, as a result of determining the driving mode (S300), a value corresponding to the second steering angle ratio value K previously determined in step S100 is applied as the front/rear-wheel steering angle ratio when the autonomous driving mode is selected (S320), and as a result, the side slip angle may be controlled to be minimal by increasing the rear-wheel steering angle ratio so that the vehicle body heading direction (Vx in FIG. 1) moves toward the vehicle velocity progress direction (V in FIG. 1). Therefore, the quickness may be enhanced while steering at the low velocity and the stability may be enhanced at the high velocity.

On the contrary, as the result of determining the driving mode (S300), when the driver driving mode is selected, a value corresponding to the first steering angle ratio value K' previously calculated in step (S100) is applied as the front/rear-wheel steering angle ratio (S310), and as a result, the sense of driving difference which the driver may feel while steering may be reduced by reducing the reduction amount of the side slip angle.

The reason is that the driver recognizes and steers the difference between the direction in which the driver intends to go and the current progress direction and when the difference between the two directions is intentionally reduced through the side slip angle control, the driver feels the sense of difference against the existing driving habit.

Consequently, in the exemplary embodiment, different front and rear-wheel steering ratios are controlled to be applied according to the driving mode determining result to minimize the side slip angle in the autonomous driving mode and reduce the sense of driving difference in the driver driving mode.

According to an exemplary embodiment of the present invention, the driving mode is determined with respect to the vehicle having the rear wheel steering system and thereafter, the front and rear-wheel steering angle ratios are controlled to be different from each other according to the resulting autonomous driving mode and driver driving mode to minimize the side slip angle in the autonomous driving mode and reduce the sense of driving difference in the driver driving mode.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for side slip angle variable control of a vehicle having a rear wheel steering, the method comprising:
    a first step of previously determining and storing, by electronic control unit (ECU), a first steering angle ratio value which corresponds to a steering angle ratio of a front wheel and a rear wheel in a driver driving mode and previously determining and storing a second steering angle ratio value which corresponds to the steering angle ratio of the front wheel and the rear wheel in an autonomous driving mode;
    a second step of determining, by the ECU, a rear-wheel steering angle through determination by a product of a multiplication between a front-wheel steering wheel angle and the second steering angle ratio value and then comparing the rear-wheel steering angle with a predetermined maximum steering angle of a rear wheel steering (RWS);
    a third step of determining, by the ECU, a driving mode by a selection of one of the driver driving mode and the autonomous driving mode when the rear-wheel steering angle is determined to be smaller than the RWS maximum steering angle; and
    a fourth step of controlling the front-wheel steering angle ratio and the rear-wheel steering angle ratio to be different from each other depending on the driving mode of the autonomous driving mode and driver driving mode determined in the third step, thereby controlling the rear-wheel steering angle according to the resultant angle ratio corresponding to the driving mode.

2. The method of claim 1, wherein in the third step, when the driver driving mode is determined, the first steering angle ratio value previously determined in the first step is applied.

3. The method of claim 1, wherein in the third step, when the autonomous driving mode is determined, the second steering angle ratio value previously determined in the first step is applied.

4. The method of claim 1, wherein in the second step, when the rear-wheel steering angle is determined to be larger than the RWS maximum steering angle, a driving mode of the driver driving mode and the autonomous driving mode is configured to be determined.

5. The method of claim 4, wherein in the second step, when the driver driving mode is determined, the first steering angle ratio value previously determined in the first step is applied and when the autonomous driving mode is determined, the RWS maximum steering angle is applied to the rear-wheel steering angle.

6. A method for side slip angle variable control of a vehicle having a rear wheel steering, the method comprising:
    a first step of previously determining and storing, by electronic control unit (ECU), a first steering angle ratio value which corresponds to a steering angle ratio of a front wheel and a rear wheel in a driver driving mode and previously determining and storing a second steering angle ratio value which corresponds to the steering angle ratio of the front wheel and the rear wheel in an autonomous driving mode, wherein the second steering angle ratio value is larger than the first steering angle ratio value;

a second step of determining, by the ECU, a rear-wheel steering angle through determination by a product of a multiplication between a front-wheel steering wheel angle and the second steering angle ratio value and then comparing the rear-wheel steering angle with a predetermined maximum steering angle of a rear wheel steering (RWS);

a third step of determining, by the ECU, a driving mode by a selection of one of the driver driving mode and the autonomous driving mode when the rear-wheel steering angle is determined to be smaller than the RWS maximum steering angle, and a fourth step of controlling the front-wheel steering angle ratio and the rear-wheel steering angle ratio to be different from each other depending on the driving mode of the autonomous driving mode and driver driving mode determined in the third step, thereby controlling the rear-wheel steering angle according to the resultant angle ratio corresponding to the driving mode.

\* \* \* \* \*